Aug. 31, 1937.     F. J. J. J. HENRARD     2,091,592
CREAM SEPARATOR
Filed March 9, 1935     2 Sheets-Sheet 1

Inventor
Ferdinand Jean Joseph Julien Henrard
By B. Singer, atty.

Aug. 31, 1937.  F. J. J. J. HENRARD  2,091,592
CREAM SEPARATOR
Filed March 9, 1935  2 Sheets-Sheet 2

Inventor
Ferdinand Jean Joseph Julien Henrard
By P. Singer, atty.

Patented Aug. 31, 1937

2,091,592

UNITED STATES PATENT OFFICE 2,091,592

CREAM SEPARATOR

Ferdinand Jean Joseph Julien Henrard, Brussels, Belgium, assignor to Ecremeuses Mélotte, Societe Anonyme, Remicourt, Belgium Application March 9, 1935, Serial No. 10,301
In Belgium January 19, 1935

3 Claims. (Cl. 233—29)

My present invention relates to centrifugal cream separators and has for an object to ensure an easy assembling or mounting of the dismountable parts thereof as well as an accurate and rapid setting of the conical elements or sleeves and of the milk distributing chamber.

It has for a further object to increase the separating capacity of the machine between the lighter liquid and the heavier one.

With these objects in view, my invention essentially consists in the special arrangements and combination of parts hereinafter fully described and pointed out in the appended claims.

On the annexed drawings which show by way of example one embodiment of the invention—

Figures 3 and 4 are two views in perspective of the conical elements or sleeves.

Figure 1:
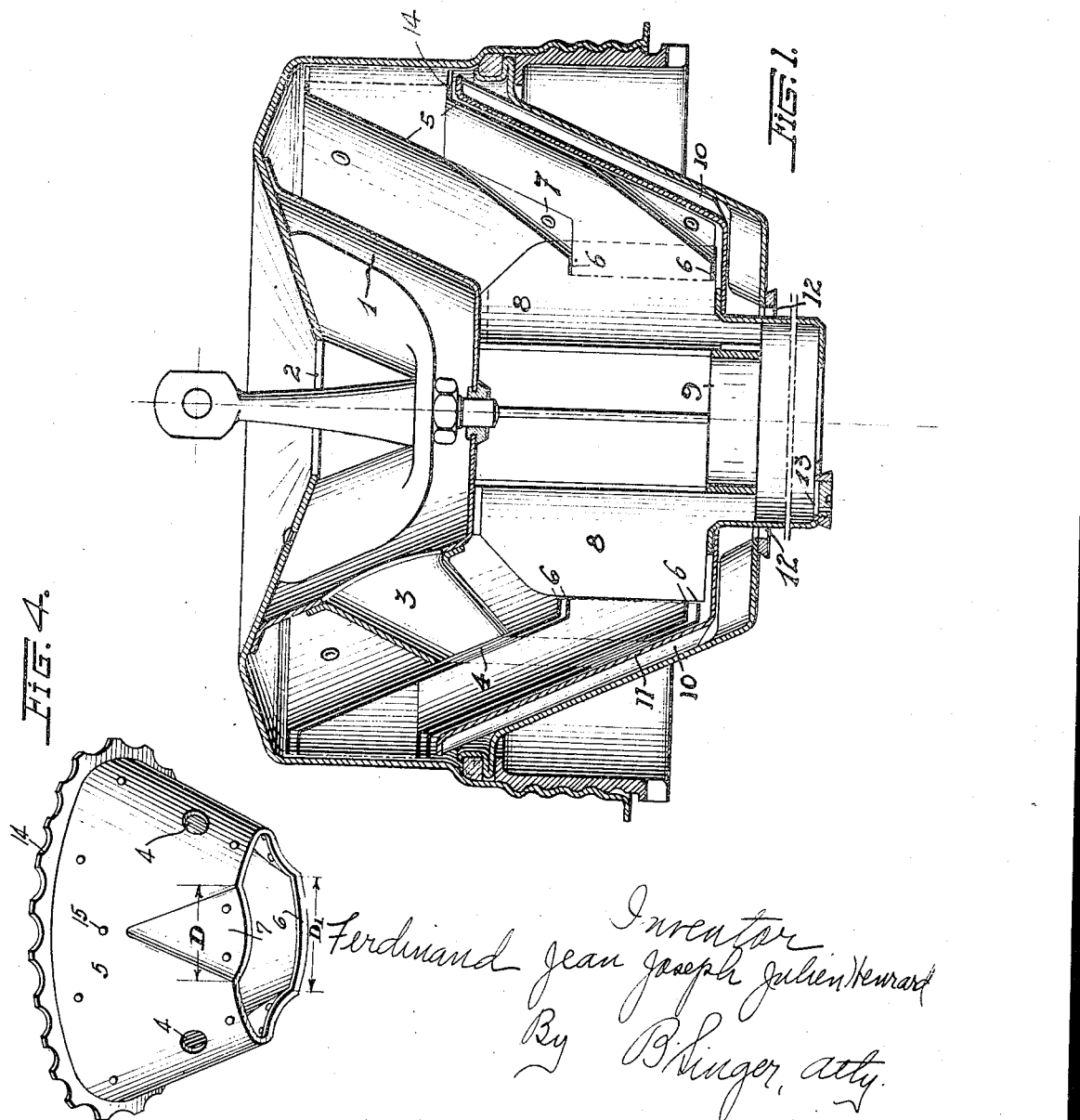
Figure 1 is a longitudinal cross section.
Figure 2:
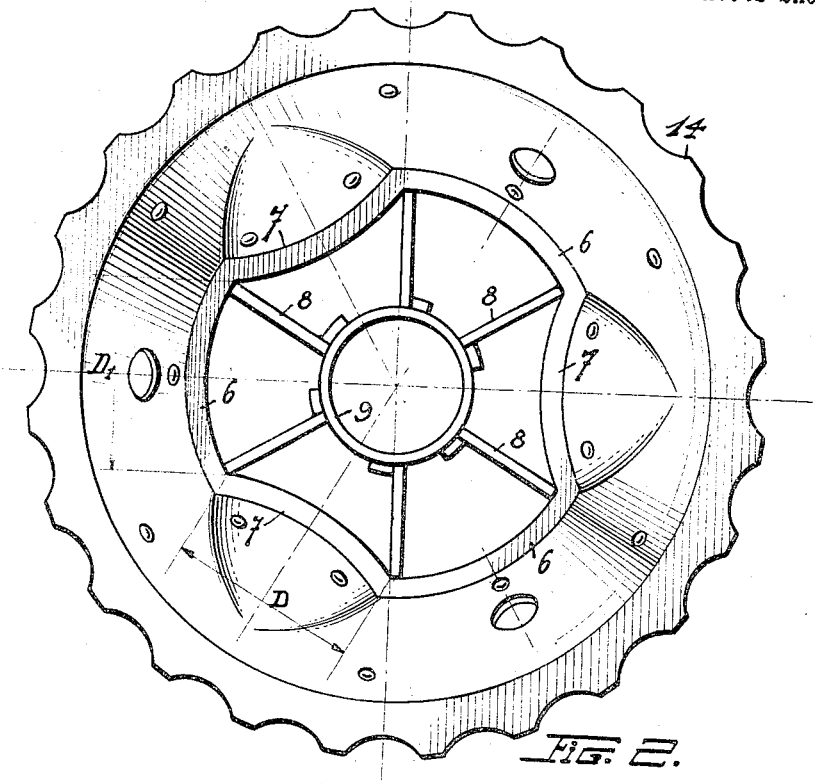
Figure 2 is a plan view.
Figure 3:
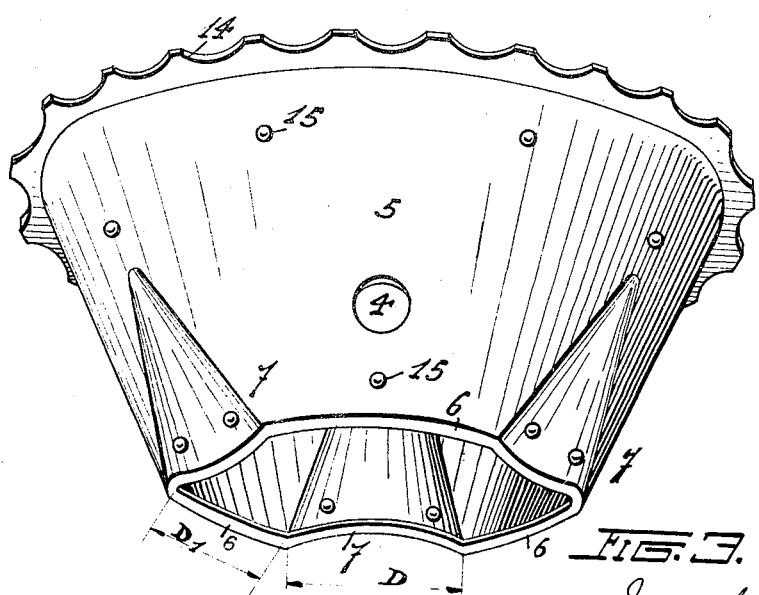

On these drawings, 1 designates an upper chamber in which the milk is poured through an opening 2. This chamber is provided with tubes or ducts 3 leading to openings 4 provided in conical elements 5 as commonly used.

According to the invention, these conical elements 5 are provided at their lower end, on their outside face and close to their lower edge 6, with hollows, inwardly directed embossings or folds of conical section 7.

These folds, which widen in a downward direction, are formed in such a manner that the distance D between the ends of one same fold at the edge 6 of the sleeves, is different from the distance $D_1$ between the ends of two successive folds.

On the other hand, on the bottom of the chamber 1 are fixed blades 8 which extend downwardly so as to engage between the folds of the conical elements. These blades 8 are fixed at their lower end to a circular member 9.

Under these conditions, the milk which flows through the tubes 3 is thrown at the speed of the bowl in such a manner as to pass between the conical elements 5 wherein the light element and the heavier element, namely the cream and the milk, become separated. The skimmed milk proceeds by following the inside walls of the sleeves 5 towards the outside and is taken up again by the ribs 10 of a false bottom 11 whence it is carried towards the outlet 12.

The cream, on the contrary, is pushed towards the centre whilst following the outside walls of the conical elements and reaches the outlet 13.

As will be easily understood, the hollows or folds 7 ensure an easy and rapid assembling or mounting of the conical sleeves and an equally easy and rapid setting of same in the milk distributing chamber, which constitutes an important advantage, if one considers that such assembling and setting is to be frequently repeated and has to be effected by people who are not skilled in the art.

Further, owing to the co-operation of the blades 8 with the folds 7, the central distributing member can also be easily set, as the tubes 3 come unfailingly in front of the openings of the conical sleeves.

Finally, owing to the folds 7, the two liquids are collected or conducted in such a manner that the lighter liquid does not meet with the heavier one. As shown in the drawings, the sleeves are provided on their upper edge with indentments 14 and on their external face with rivets 15 ensuring their position at a certain distance from each other.

What I claim is:

1. In a cream separator, the combination with a distributing chamber for the milk to be treated of conical elements fitting into each other, each of the said elements comprising at its lower part embossings which are internally directed, the lower edges of which form curved lines inclined towards the centre of the conical element and connected to the curved lines formed by the circular border of the conical element, in forming edges, blades connected to the distributing chamber and engaging into the edges formed by the curved lines of the lower border of the elements.

2. In a cream separator, a casing having a central distributing chamber provided with an inlet opening in its top and having radially positioned outlet ducts, a set of nested conical elements within said casing and surrounding said distributing chamber, each of said conical elements having apertures in its walls, the apertures of the uppermost conical element being in direct connection with the respective outlet ducts, while the apertures of all subadjacent conical elements are in indirect communication with the respective outlet ducts by being in vertical alignment with the respective apertures of the uppermost conical element, the upper end of each of said conical elements extending outwardly laterally and having indentations, the lower extremity of each of said conical elements having inwardly directed portions of conic section, the chord of the lower edge of a conic section being of a different length than the chord of the curved lower edge portion of the conical element between adjacent inwardly directed portions, the apertures in the walls of the several conical elements being located at the same relative places between adjacent ones of the said inwardly directed portions whereby the several conical elements can only be nested in such positions as to insure proper registration of their apertures with one another and with said outlet ducts, means to space said conical elements apart, and means separately to discharge the milk and cream at the bottom of the separator.

3. In a cream separator, a casing having a central distributing chamber provided with an inlet opening in its top and having radially positioned outlet ducts, a set of nested conical elements within said casing and surrounding said distributing chamber, each of said conical elements having apertures in its walls, the apertures of the uppermost conical element being in direct connection with the respective outlet ducts, while the apertures of all subadjacent conical elements are in indirect communication with the respective outlet ducts by being in vertical alignment with the respective apertures of the uppermost conical element, the upper end of each of said conical elements extending outwardly laterally and having indentations, the lower extremity of each of said conical elements having inwardly directed portions of conic section, the chord of the lower edge of a conic section being of a different length than the chord of the curved lower edge portion of the conical element between adjacent inwardly directed portions, the apertures in the walls of the several conical elements being located at the same relative places between adjacent ones of the said inwardly directed portions whereby the several conical elements can only be nested in such positions as to insure proper registration of their apertures with one another and with said outlet ducts, means to space said conical elements apart, and means separately to discharge the milk and cream at the bottom of the separator, said separator including radially disposed blades located within the lower openings of the conical elements and engaging said conical elements at the angles between the inwardly and outwardly curved portions of the lower ends of said conical members.

FERDINAND JEAN JOSEPH
JULIEN HENRARD.